United States Patent
Benner et al.

(10) Patent No.: US 10,065,608 B2
(45) Date of Patent: Sep. 4, 2018

(54) WIPER FLOW GUIDER AND WIPER ASSEMBLY

(71) Applicant: Unipoint Electric Mfg. Co. Ltd., Taipei (TW)

(72) Inventors: Andreas Benner, Taipei (TW); Sam Lai, Taipei (TW); Irving Chiu, Taipei (TW); Hsuhui Huang, Taipei (TW); Chienhung Lai, Taipei (TW)

(73) Assignee: Unipoint Electric Mfg. Co. Ltd., Taipei (TW)

( * ) Notice: Subject to any disclaimer, the term of this patent is extended or adjusted under 35 U.S.C. 154(b) by 773 days.

(21) Appl. No.: 14/581,098

(22) Filed: Dec. 23, 2014

(65) Prior Publication Data

US 2015/0175132 A1 Jun. 25, 2015

(30) Foreign Application Priority Data

Dec. 25, 2013 (CN) .......................... 2013 1 0727472

(51) Int. Cl.
*B60S 1/38* (2006.01)

(52) U.S. Cl.
CPC ............. *B60S 1/3879* (2013.01); *B60S 1/381* (2013.01); *B60S 1/3881* (2013.01); *B60S 1/3858* (2013.01); *B60S 1/3889* (2013.01)

(58) Field of Classification Search
CPC ...... B60S 1/381; B60S 1/3881; B60S 1/3889; B60S 1/3891; B60S 1/3858; B60S 1/3879
USPC .................................................... 15/250.201
See application file for complete search history.

(56) References Cited

U.S. PATENT DOCUMENTS

| | | | | |
|---|---|---|---|---|
| 8,191,200 B2 * | 6/2012 | Kim | ......................... | B60S 1/387 15/250.201 |
| 8,413,291 B2 * | 4/2013 | Wu | ......................... | B60S 1/3858 15/250.201 |
| 2007/0061994 A1 * | 3/2007 | Lee | ............................ | B60S 1/38 15/250.201 |
| 2008/0052865 A1 * | 3/2008 | Chiang | ...................... | B60S 1/38 15/250.43 |
| 2008/0098554 A1 * | 5/2008 | Cho | ........................... | B60S 1/38 15/250.32 |

(Continued)

FOREIGN PATENT DOCUMENTS

| EP | 1829758 | * | 9/2007 |
|---|---|---|---|
| FR | 2869279 | * | 10/2005 |

*Primary Examiner* — Gary Graham
(74) *Attorney, Agent, or Firm* — Michael Best & Friedrich LLP

(57) ABSTRACT

A flow guider and a wiper assembly for wiper, wherein a spring rail is detachably received in the flow guider which is provided with a longitudinal slot providing along the extension direction of the flow guider for accommodating the spring rail, and a receiving portion being able to receive the edges of the spring rail is provided on the side portions of the flow guider forming the longitudinal slot, for restricting the breakaway of the spring rail from the flow guider, wherein at least one stopper is provided on the longitudinal side walls of the longitudinal slot of the flow guider, a stop portion is provided on the spring rail for cooperating with the stopper, and the mutual cooperation of the stopper and the stop portion can stop the breakaway of the spring rail from the flow guider in the extension direction of the flow guider.

6 Claims, 7 Drawing Sheets

(56) References Cited

U.S. PATENT DOCUMENTS

| | | | |
|---|---|---|---|
| 2008/0235896 A1* | 10/2008 | Cheng | B60S 1/3881 15/250.201 |
| 2010/0242204 A1* | 9/2010 | Chien | B60S 1/381 15/250.201 |
| 2010/0319154 A1* | 12/2010 | Bousset | B60S 1/3889 15/250.48 |

* cited by examiner

WIPER FLOW GUIDER AND WIPER ASSEMBLY

BACKGROUND OF THE INVENTION

The present invention relates to the field of flow guiders or spoilers for wipers and wiper assemblies, and in particular to a flow guider for a wiper and a wiper assembly which are provided with good performances on stability and disassembly to assist the wiper spring rail to be connected firmly to the wiper.

Automobiles are currently universal transport used by the public, especially when it is windy and rainy. In addition to act as a replacer of walk, automobiles have a better function of sheltering from wind and rain than bicycles or motorcycles. Automobiles will mostly use wiper to keep driving sight and ensure safety when running in the rain. Generally speaking, the wiper comprises a wiper rod, of which a connecting portion cooperates with an adapter so that a wiper arm is connected to the wiper rod. The wiper arm can be driven by a driving component so as to drive the wiper rod connected to the wiper arm, thus enabling the wiper to wipe the windshield. In other words, vehicle wiper device is typically mounted adjacent to vehicle windshield. The wiper rod of the wiper reciprocates in the range of the wiper of the windshield, whereas the wiper rod is used to remove depositions such as dust or water stains, for example, rain or snow pieces adhered to the windshield.

The end face of one end of a portion of existing wiper flow guiders has mostly open configuration. The above-mentioned open end of the flow guiders is used for receiving spring rail, whereas after the spring rail has been received in the flow guider from the above-mentioned open end of the flow guider, it needs to additionally use an end cap to be fixed to one end of the flow guider to enclose the end of the spring rail appropriately, thereby preventing the spring rail passing through the flow guider from the end of the open flow guider. However, such a configuration undoubtedly adds additional manufacturing process and material cost.

The other portion of existing wiper flow guiders are configured that the end face of one end of the flow guiders is close in order to improve manufacturing process and material cost problems caused by the additional use of end cap. However, such a flow guider merely close its end face and fails to enclose the end of the spring rail appropriately at the end. It is therefore unable to produce an effective fixing effect to the end of the spring rail. That is, two ends of the spring rail are still easy to break away from the fixing mechanism of the flow guider during using the wiper, resulting in two ends of the spring rail protruding out of the fixing mechanism of the flow guider and the wiper fails to work. In addition, such a wiper flow guider is further provided with a stop portion in the shape of a rectangle, and the end of the stop portion connected to the side surface of the flow guider is the end that has smaller width, thereby to cooperate with the spring rail having a groove in the shape of a trapezoid so as to prevent the displacement between the spring rail and the flow guider in the longitudinal direction. However, the stop portion with such a configuration is not easy to be embedded into the groove, and therefore causing difficulties in assembly. Furthermore, when the stop portion with such a configuration is embedded into the groove, the stop portion will produce a considerable distortion and therefore, the stop portion is prone to be damaged and unable to server the fixing function after repeated assemblies and disassemblies. Therefore, there should be more sophisticated needs for existing flow guiders in the respects of fixing the spring rail firmly and preventing the breakaway of the spring rail and facilitating the user's operation.

SUMMARY OF THE INVENTION

The aftermentioned embodiments of the present invention are directed to a flow guider for wiper and a wiper assembly for wiper, which have substantively overcome one or more problems caused by the limitations and disadvantages in the prior art.

One objective of the present invention is to provide a flow guider for wiper, and a spring rail is detachably received in the flow guider. The flow guider is provided with a longitudinal slot providing along the extension direction of the flow guider for accommodating the spring rail. A receiving portion being able to receive the edges of the spring rail is provided on the side portions of the flow guider forming the longitudinal slot, for restricting the breakaway of the spring rail from the flow guider, wherein at least one stopper is provided on the longitudinal side walls of the longitudinal slot of the flow guider, a stop portion is provided on the spring rail for cooperating with the stopper, and the mutual cooperation of the stopper and the stop portion can stop the breakaway of the spring rail from the flow guider in the extension direction of the flow guider.

Preferably, the flow guider may further comprise a connecting portion, two supporting portions and a limiting edge. The connecting portion is connected curvedly to the side portions forming the longitudinal slot at one end of the flow guider. The two supporting portions are provided at the bottom of the longitudinal slot and are adjacent to the side portions respectively. The limiting edge extends along the edges of the side portions and the connecting portion towards the interior direction of the longitudinal slot, and the spring rail is received in the longitudinal slot between the limiting edge and the two supporting portions, and the distance between the limiting edge and the two supporting portions corresponds to the thickness of the spring rail.

Preferably, the connecting portion is connected to the two side portions in the shape of a semi-circle or a semi-ellipse.

Preferably, at least one notch is provided at the end of the limiting edge which is adjacent to the flow guider, and the notch locates on the side portions forming the longitudinal slot.

Preferably, the stopper is provided in the notch and configured to be a protuberance protruding between the side portions, and the stop portion of the spring rail is a groove for corresponding to the stopper.

Preferably, the stopper further comprises a guide portion which is provided on two sides of one end of the stopper and is opposite to the other end of the stopper connected to the side portions, and the guide portion is of an arc-like structure.

Preferably, the stopper is provided with a hollowed-out portion which locates adjacent to the geometric center of the stopper.

Preferably, the stopper comprises two stop blocks which locate on two sides of the notch and are connected between the limiting edge and the supporting portions, and between the limiting edge and the bottom of the longitudinal slot, respectively, and the stop portion of the spring rail is configured to be two grooves for corresponding to the two stop blocks of the stopper.

Preferably, the stopper further comprises a guide portion which is provided on two sides of one end of the stop blocks of the stopper and is opposite to the other end of the stop blocks connected to the side portions, and the guide portion is of an arc-like structure.

Another objective of the present invention is to provide a wiper assembly being able to cooperate with a wiper arm, which comprises a spring rail, and two flow guiders which can be detachably provided at two ends of the spring rail respectively, and a wiper connector which is provided on the spring rail and locates between the two flow guiders.

In order to further understand and realize the technical features of the invention and the effects achieved, the present invention will be described hereinafter by means of the preferred embodiments.

DETAILED DESCRIPTION

The embodiments will be described with more details hereinafter with reference to the accompanying drawings; however, all of these embodiments can be implemented in different forms and should not be considered as being merely limited to these embodiments set forth herein. More specifically, these embodiments are used to make the disclosure more thorough and complete and to fully convey the scope of the present invention to those skilled in the art.

Figure 1:
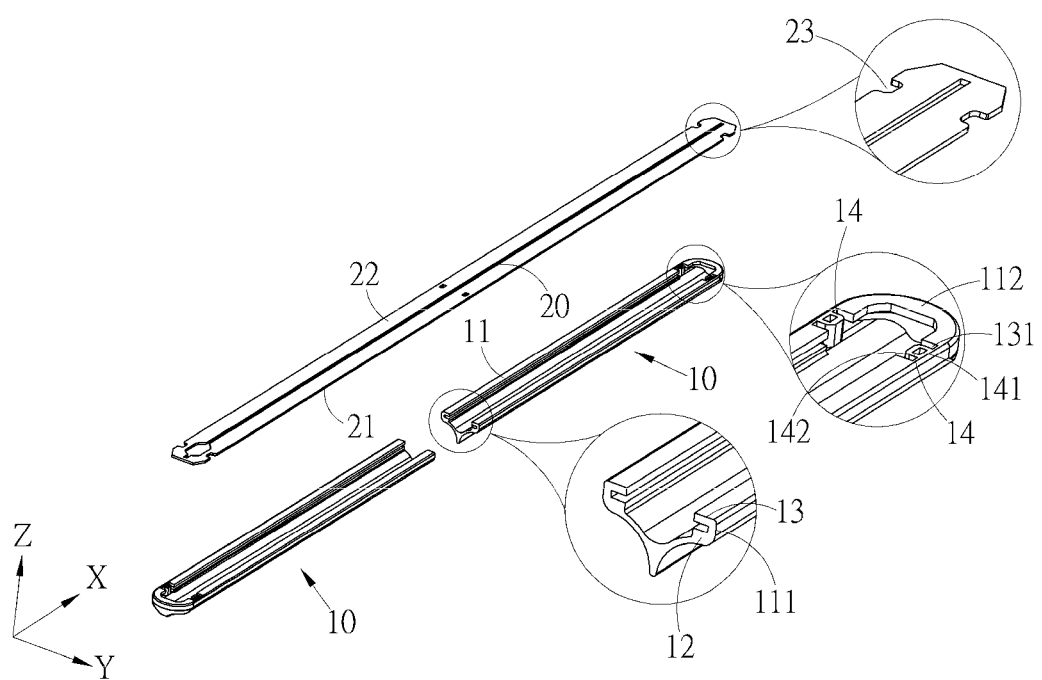
FIG. 1 is a schematic exploded view of a flow guider for wiper in accordance with the present invention.
Figure 2:
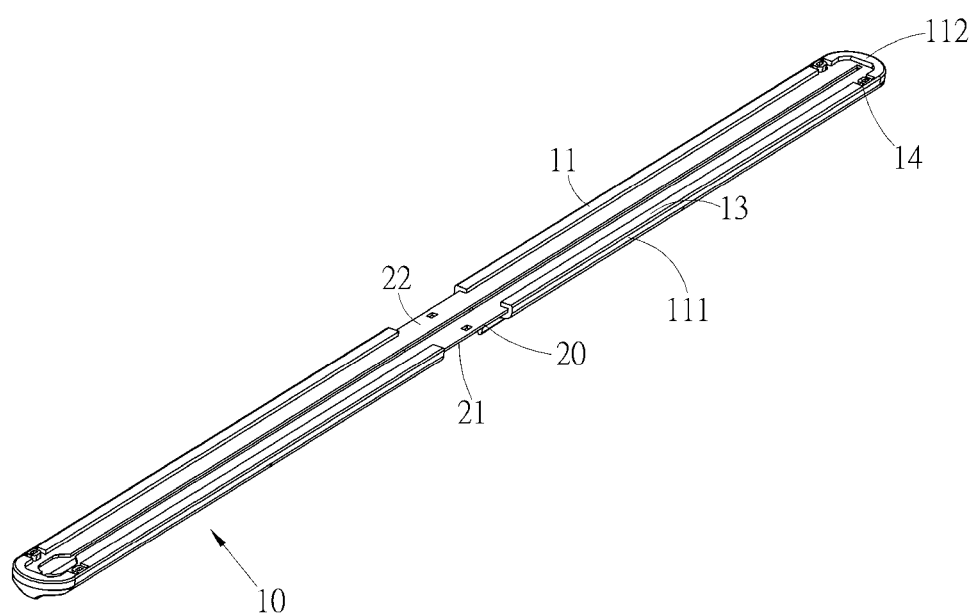
FIG. 2 is a schematic assembled view of a flow guider for wiper in accordance with the present invention.

Please refer to FIG. 1 to FIG. 4 together, which are schematic exploded view, schematic assembled view, schematic partial sectional view and schematic partial view of a flow guider for wiper in accordance with the present invention respectively. As shown in FIG. 1 and FIG. 2, the flow guider or spoiler 10 of the present invention comprises a the flow guider body 11, two supporting portions 12, a limiting edge 13 and two stoppers 14, wherein the flow guider body 11 is preferably made of flexible and soft plastic such as rubber. The flow guider body 11 includes two separated side portions 111 and connecting portions 112. Each of the side portions 111 is provided along the X direction as shown in the figures (i.e. the longitudinal direction), and the connecting portion 112 is connected curvedly to the two side portions 111 at one end of the flow guider 10 so as to form a longitudinal slot. That is to say, one end of the flow guider 10 is closed completely when a spring rail 20 is provided in the flow guider 10, and thereby the spring rail 20 is unable to break away from the one end of the flow guider 10.

It is should be specially noted that the connecting portion 112 is connected curvedly to the two side portions 111 at one end of the flow guider 10 in the shape of a semi-circle or a semi-ellipse, and thereby the breakaway or passing through of the spring rail 20 from the flow guider 10 can also be prevented and simultaneously, both flowability and streamlined appearance are achieved.

Figure 3:
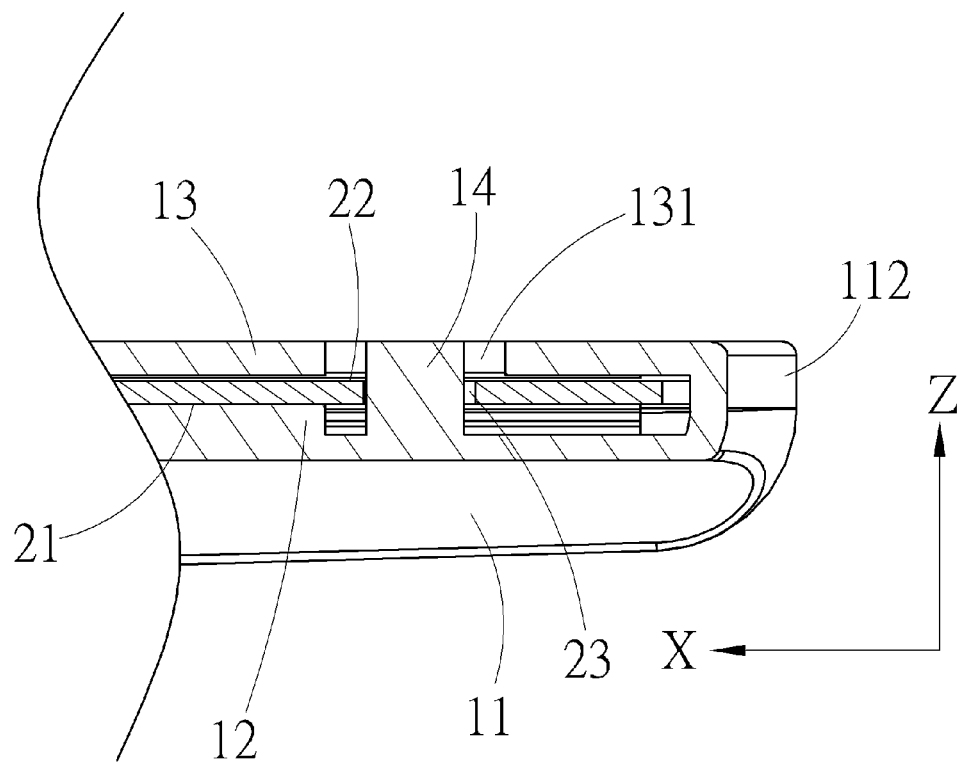
FIG. 3 is a schematic partial sectional view of a flow guider for wiper in accordance with the present invention.

Please refer to FIG. 1 in conjunction with FIG. 3. In addition, two supporting portions 12 are provided in the region of the longitudinal slot formed by the side portions 111 and the connecting portion 112, and the two supporting portions 12 are provided along the wall surfaces of the two side portions 111 respectively. That is, the two supporting portions 12 are provided in the region of the longitudinal slot adjacent to respective side portions 111. The limiting edge 13 is formed by extending oppositely along the edges of the two side portions 111, and also extending from the edges of the connecting portion 112 towards the direction of the other end of the flow guider body 11. That is, the limiting edge 13 extends towards the interior direction of the region of the longitudinal slot along the edges of the two side portions 111 and the connecting portion 112. Therefore, a receiving area for receiving the spring rail 20 can be formed between the supporting portions 12 and the limiting edge 13 in the longitudinal slot, and by means of the connecting portion 112 and the limiting edge 13, the freedom degree of the displacement in the Z direction of the stopper 13 received in the flow guider body 11 (i.e. the open direction of the longitudinal slot), as shown in the figures, is restricted.

It is worth specifically describing that the distance between the above two separated side portions 111 may correspond to the width of the spring rail 20 and an appropriate adjustment is provided in order to use the two side portions 111 to restrict the freedom degree of the displacement in the Y direction of the spring rail 20 (i.e. the transverse direction), as shown in the figures. That is to say, the distance between the two side portions 111 may be equal to or slightly less than the width of the spring rail 20, or based on the consideration of ease for assembly, the distance between the two side portions 111 may be slightly larger than the width of the spring rail 20. Furthermore, the distance between the supporting portions 12 and the limiting edge 13 may correspond to the thickness of the spring rail 20 and an appropriate adjustment is provided. For example, the distance between the supporting portions 12 and the limiting edge 13 may be equal to or slightly less than the thickness of the spring rail 20, or based on the consideration of ease for assembly, the distance between the supporting portions 12 and the limiting edge 13 may be slightly larger than the thickness of the spring rail 20.

By means of the above enclosed type provision of the spring rail 20 that it is received by the side portions 111, the supporting portions 12 and the limiting edge 13, when the spring rail 20 is received in the flow guider 10, the side portions 111 can prevent the relative movement between the flow guider 10 and the spring rail 20 in the Y direction, and the supporting portions 12 and the limiting edge 13 can prevent the relative movement between the flow guider 10 and the spring rail 20 in the Z direction.

By means of the above structure, the above side portions 111, the supporting portions 12, the limiting edge 13 and the connecting portions 112 of the flow guider 10 form a receiving portion that can accommodate the edges of the above spring rail 20 so as to restrict the breakaway of the spring rail 20 from the flow guide 10.

On the other hand, in order to further prevent the relative movement between the flow guider 10 and the spring rail 20 in the X direction, two stoppers 14 are provided on the side walls of the side portions 111 respectively, and the two stoppers 14 are located within the region of the longitudinal slot and are adjacent to one end of the flow guider body 11. Correspondingly, a stop portion 23 is provided respectively at the corresponding position of the two sides of the spring rail 20 that corresponds to the two stoppers 14, and the stop portions 23 are adjacent to the end of the spring rail 20.

Figure 4:
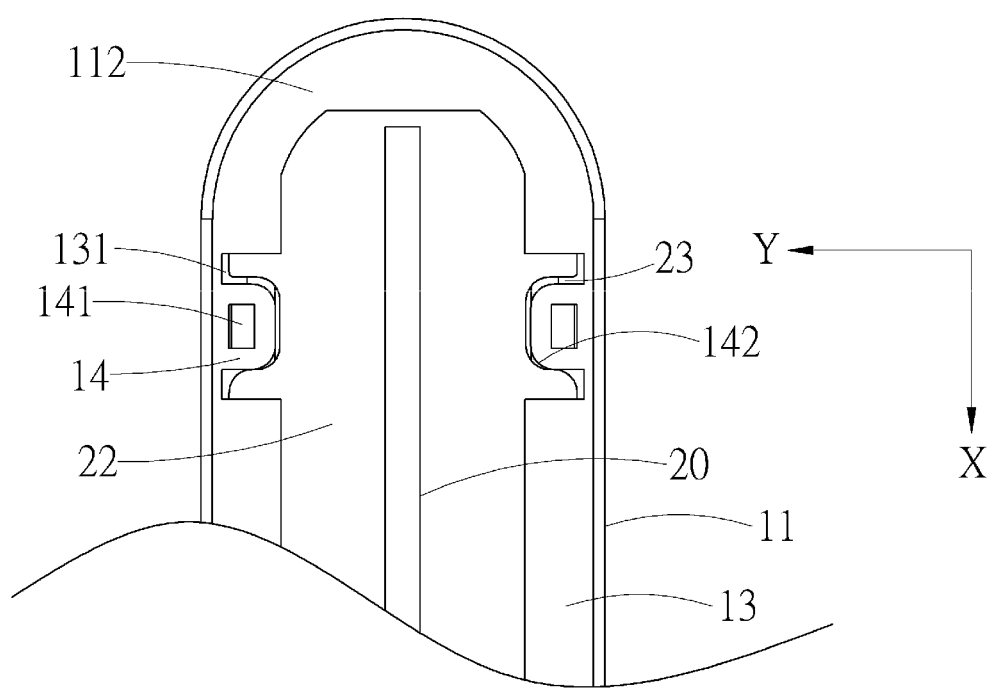
FIG. 4 is a schematic partial view of a flow guider for wiper in accordance with the present invention.

Please refer to FIG. 1 in conjunction with FIG. 4. Specifically, two notches 131 are provided at one end of the limiting edge 13 which is adjacent to the flow guider body 11, and the two notches 131 are adjacent to the two side portions 111 respectively. Two stoppers 14 are provide in the notches 131 in the form of protuberance respectively. That is to say, the ends of the stoppers 14 provided in the form of protuberance are connected to the wall surfaces of the side portions 111 and project towards the direction between the two side portions 111. Herein, the stop portions 23 of the spring rail 20 may be provided in the form of groove, so as to correspond to the stoppers 14 in the form of protuberance. When the spring member 20 is received in the flow guider 10, by means of the side walls of the protuberances of the stoppers 14 resisting against the inner side walls of the grooves of the stop portions 23, it is therefore the relative movement between the flow guider 10 and the spring rail 20 in the X direction can be prevent effectively. In addition, the stopper 14 may be, more preferably, made integrally with the flow guider body 11, and a hollowed-out portion 141 may be provided on the protuberance of the stopper 14, which is adjacent to the geometric center position of the protuberance of the stopper 14, thus avoiding the problems such at shrinkage or deformation possibly caused during the stopper 14 is formed integrally with the flow guider body 11 by using injection molding.

When assembling, the operator may firstly embed one side of the spring rail 20 between the supporting portions 12 and the limiting edge 13 at one side of the flow guider 10 first, and simultaneously, the protuberances of the stoppers 14 will be embedded into the grooves of the stop portions 23 of the spring rail 20. As the flow guider body 11 of the flow guider 10 is made of a soft plastic material, therefore in the manner of turning over the other side of the flow guider 10 and the limiting edge 13 of the connecting portion 112, the other side of the spring rail 20 is easily embedded between the supporting portions 12 and the limiting edge 13 at the other side of the flow guider 10, and the protuberance of the stopper 14 at the other side of the flow guider 10 can be embedded into the groove of the stop portion 23 at the other side of the spring rail 20, so as to finish the assembly of the spring rail 20 with the flow guider 10. It is worth mentioning that, the stopper 14 may be provided with a guide portion 142 of curved structure, which is located on two sides at one end of the protuberance of the stopper 14, and said one end is opposite to the other end connected to the wall surface of the side portions 111. By means of the provision of the guide portion 142, during the period of embedding the protuberance of the stopper 14 into the groove of the stop portion 23, the guide portion 142 can provide appropriate guidance action, so that the protuberance of the stopper 14 can be more easily embedded into the groove of the stop portion 23. Further, the bottom of the groove of the stop portion 23 may be of an arc-like structure for corresponding to the guide portion 142, so that a consistency in appearance is achieved after the protuberance of the stopper 14 is embedded into the groove of the stop portion (as shown in FIG. 4).

Figure 5:
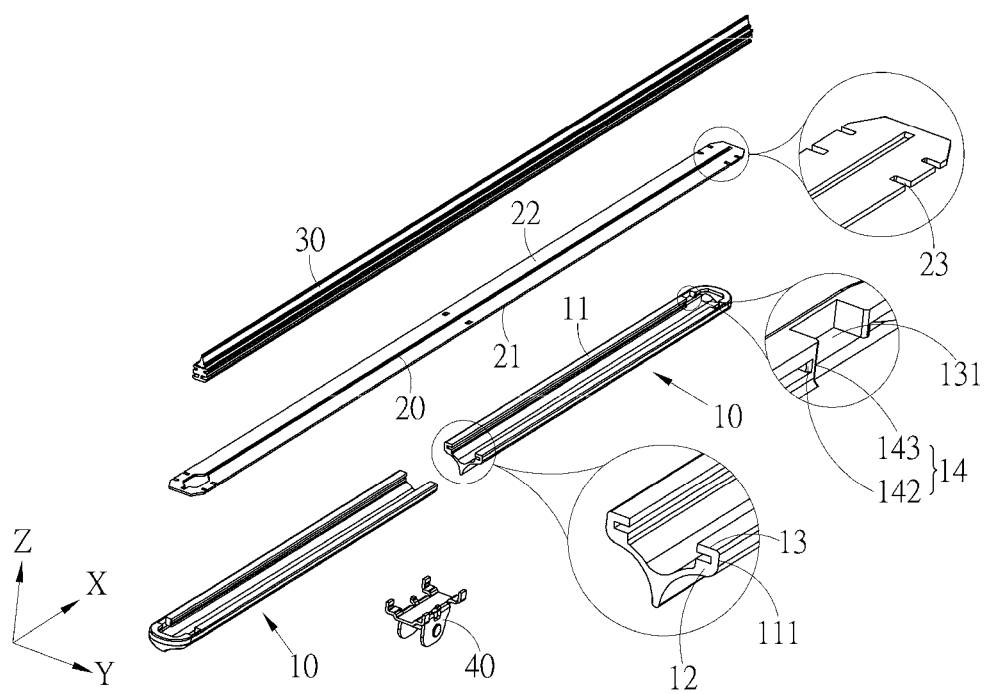
FIG. 5 is a schematic exploded view of a wiper assembly for wiper in accordance with the present invention.
Figure 6:
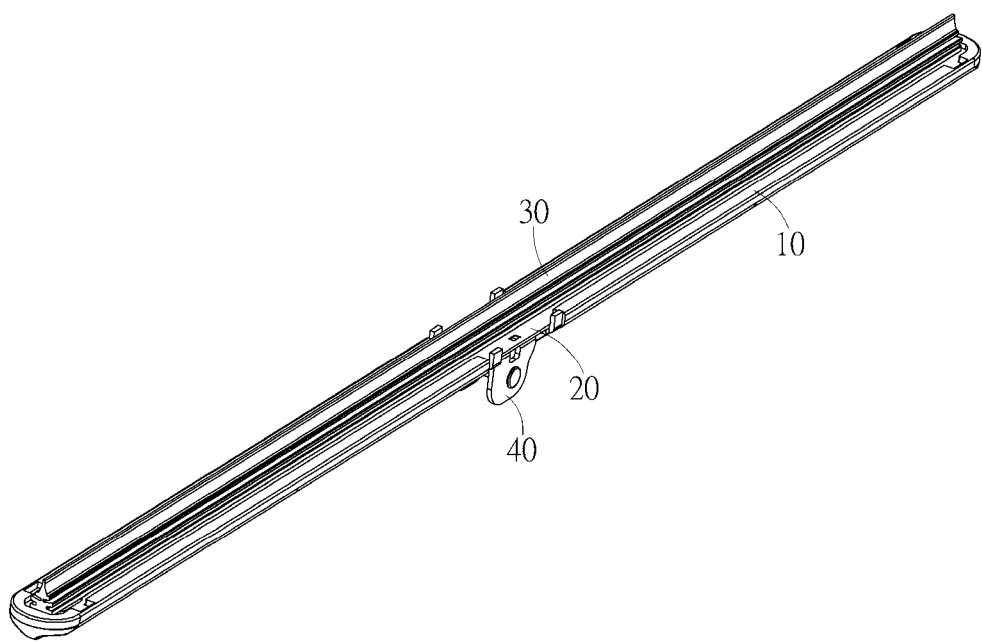
FIG. 6 is a schematic assembled view of a wiper assembly for wiper in accordance with the present invention.

Please refer to FIG. 5 in conjunction with FIG. 6, they are schematic exploded view and schematic assembled view of a wiper assembly for wiper in accordance with the present invention. As shown in the figures, the flow guider 10 for wiper in accordance with the present invention is used to be assembled with the spring rail 20, a wiper strip 30 and a wiper connector 40 to form a wiper assembly and can be used in cooperation with a wiper arm (not depicted in the figures). Wherein, two flow guiders 10 are detachably provided at two ends of the spring rail 20 respectively and located on one side surface 21 of the spring rail 20. The wiper strip 30 is detachably provided on the other side surface 22 of the spring rail 20, and said other side surface 22 is opposite to the side surface 21 including the flow guider 10. The wiper connector 40 is provided on the side surface 21 of the spring rail 20 and located between the two flow guiders 10. After the flow guider 10, the spring rail 20, the wiper strip 30 and the wiper connector 40 have been assembled into a wiper assembly, the wiper assembly can be detachably connected to the wiper arm by means of the wiper connector 40 so as to serve a removal function to the depositions on the windshield of automobiles, such as dust or water stains. In the foregoing, the technologies of providing the wiper strip 30 and the wiper connector 40 in the spring rail 20 and connecting the wiper connector 40 to the wiper arm are well-known to those skilled in the art, so that it is needless to further describe them herein.

Please make a conjunctive reference to FIG. 5, which is another embodiment of the wiper assembly for wiper in accordance with the present invention. The main configuration of this embodiment is similar to the previous embodiment, and it is therefore needless to further describe the connection and action relationships of the same or similar assemblies. This embodiment mainly differs in the provision manners of the stopper 14 and the stop portion 23 of the present embodiment. Hereinafter, the connection relationship or assembly relationship between the stopper 14 of the flow guider 10 and the stop portion 23 of the spring rail 20 will be further described.

Figure 7:
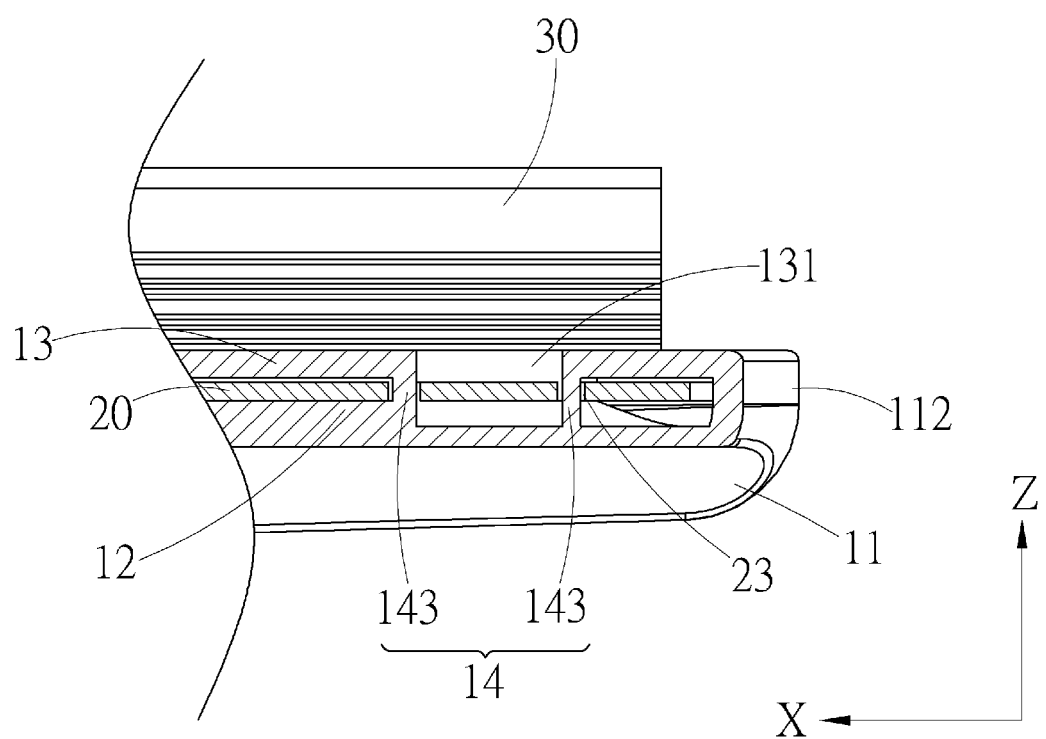
FIG. 7 is a schematic partial sectional view of a wiper assembly for wiper in accordance with the present invention.

Please make a conjunctive reference to FIG. 7, which is a schematic partial sectional view of a wiper assembly for wiper in accordance with the present invention. As shown in the figure, the stopper 14 comprises two stop blocks 143, wherein the two stop blocks 143 are located in two sides of the notch 131 respectively, and are connected between the limiting edge 13 and the supporting portion 12, and between the limiting edge 13 and the bottom of the longitudinal slot respectively. Corresponding to the two stop blocks 143 of the stopper 14, the stop portion 23 of the spring rail 20 is configured to be two grooves. Therefore, when one side of the spring rail 20 is firstly embedded between the supporting portions 12 and the limiting edge 13 at one side of the flow guider 10, and simultaneously, the two stop blocks 143 of the stopper 14 will be sequentially or simultaneously embedded into the two grooves of the stop portion 23 of the spring rail 20. Then, in the manner of turning over the other side of the flow guider 10 and the limiting edge 13 of the connecting portion 12, the other side of the spring rail 20 is easily embedded between the supporting portions 12 and the limiting edge 13 at the other side of the flow guider 10, and the two stop blocks 143 of the stopper 14 at the other side of the flow guider 10 can be embedded into the two grooves of the stop portion 23 at the other side of the spring rail 20, so as to finish the assembly of the spring rail 20 with the flow guider 10.

It can be known from the foregoing that, although the provision manners of the stopper 14 and the stop portion 23 of this embodiment differ from those of the previous embodiment, it is still effective to prevent the relative movement between the flow guider 10 and the spring rail 20 in the X direction and similarly easy for assembly. Incidentally, the stopper 14 may also comprise a guide portion 142 which is provided on two sides at one end of the stop block 143 of the stopper 14 and is opposite to the other end of the stop block 143 connected to the side portion 111. By means of the provision of the guide portion 142, the stopper 14 can be further easily embedded into the stop portion 23.

As compared to the prior art, the flow guider for wiper in accordance with the present invention has practicality. By means of the side portion, the connecting portion, the supporting portion and the limiting edge in the manner of enclosing, the flow guider for wiper and the wiper assembly for wiper receive the spring rail, thereby enabling a fixed assembly between the flow guider and the spring rail and further effectively preventing the possibility of the breakaway of the flower guider from the spring rail by utilizing the configurations of the stopper and the stop portion. Furthermore, the above-mentioned configurations can also achieve operating convenience which is convenient and helpful to the users or relevant persons. Therefore, it is considerable convenient whether assembling or disassembling, and the stopper will not cause a damaged situation and can also maintain stable assembly function after repeated assemblies and disassemblies.

The above description is merely illustrative rather than limiting. Any equivalent modifications or variations to the present invention made without departing from the spirit and scope of the present invention should be covered by the appended claims.

DESCRIPTION OF REFERENCE NUMERALS

10 flow guider
11 flow guider body
111 side portion
112 connecting portion
12 supporting portion
13 limiting edge
131 notch
14 stopper
141 hollowed-out portion
142 guide portion
20 spring rail
21 one end of the spring rail
22 the other end of the spring rail
23 stop portion
30 wiper strip
40 wiper connector

What is claimed is:

1. A wiper flow guider, wherein a spring rail is detachably received in the flow guider, wherein the flow guider is provided with a longitudinal slot extending along an extension direction of the flow guider for accommodating the spring rail, and a receiving portion configured to receive edges of the spring rail is provided on side portions of the flow guider forming the longitudinal slot, for restricting breakaway of the spring rail from the flow guider, wherein at least one stopper is provided on the side portions, and a stop portion is provided on the spring rail for cooperating with the stopper, and mutual cooperation of the stopper and the stop portion stops breakaway of the spring rail from the flow guider in the extension direction of the flow guider, wherein the wiper flow guider includes supporting portions which extend laterally inwardly from the side portions and define a bottom of the longitudinal slot, and two limiting edges which extend laterally inwardly from the side portions and define a top of the longitudinal slot, wherein the spring rail is received in the longitudinal slot between the limiting edges and the supporting portions, wherein a notch is provided along one of the limiting edges, wherein the stopper includes two stop blocks located adjacent the notch on opposite sides of the notch, wherein the stop blocks extend between the limiting edge and the supporting portion located beneath the limiting edge, and wherein the stop portion on the spring rail includes two grooves that receive the two stop blocks of the stopper.

2. The flow guider according to claim 1, further comprising a connecting portion which is connected curvedly to the side portions forming the longitudinal slot at one end of the flow guider, wherein the limiting edge extends along the connecting portion, and wherein a distance between one of the limiting edges and one of the supporting portions corresponds to a thickness of the spring rail.

3. The flow guider according to claim 2, characterized in that the connecting portion is connected to the two side portions in the shape of a semi-circle or a semi-ellipse.

4. The flow guider according to claim 1, characterized in that the stopper further comprises a guide portion along at least one of the two stop blocks, wherein the guide portion has an arc-shaped structure.

5. A wiper assembly configured to cooperate with a wiper arm, comprising:
two flow guiders according to claim 1, which are detachably connected at respective ends of the spring rail; and
a wiper connector which is provided on the spring rail and is located between the two flow guiders.

6. A wiper flow guider, wherein a spring rail is detachably received in the flow guider, wherein the flow guider is provided with a longitudinal slot extending along an extension direction of the flow guider for accommodating the spring rail, and a receiving portion configured to receive edges of the spring rail is provided on side portions of the flow guider forming the longitudinal slot, for restricting breakaway of the spring rail from the flow guider, wherein at least one stopper is provided on the side portions, and a stop portion is provided on the spring rail for cooperating with the stopper, and mutual cooperation of the stopper and the stop portion stops breakaway of the spring rail from the flow guider in the extension direction of the flow guider, the flow guider further including a connecting portion which is connected curvedly to the side portions forming the longitudinal slot at one end of the flow guider, two supporting portions which are provided at a bottom of the longitudinal slot and are adjacent to the side portions respectively, and a limiting edge extending along edges of the side portions and the connecting portion towards an interior direction of the longitudinal slot, and the spring rail is received in the longitudinal slot between the limiting edge and the two supporting portions, and a distance between the limiting edge and the two supporting portions corresponds to a thickness of the spring rail, wherein at least one notch is provided at an end of the limiting edge which is adjacent to the flow guider, and the notch is located on the side portions forming the longitudinal slot, and wherein the stopper comprises two stop blocks which are located on two sides of the notch and are connected between the limiting edge and the supporting portions, and between the limiting edge and the bottom of the longitudinal slot, respectively, and the stop portion of the spring rail is configured to be two grooves corresponding to the two stop blocks of the stopper.

* * * * *